(12) United States Patent
Poole et al.

(10) Patent No.: US 6,225,576 B1
(45) Date of Patent: *May 1, 2001

(54) SHEAR BEAM LOAD CELL

(75) Inventors: David L. Poole, Portland; Lewis L. Seffernick, Decatur, both of IN (US); David L. Kordecki, Briarwood, CT (US)

(73) Assignee: CTS Corporation, Elkhart, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/295,038

(22) Filed: Apr. 20, 1999

(51) Int. Cl.[7] .............................. G01G 3/14; G01G 3/08
(52) U.S. Cl. ................. 177/211; 177/229; 73/862.474
(58) Field of Search ............... 73/862.474, 862.627, 73/862.639, 862.634; 177/211, 229

(56) References Cited

U.S. PATENT DOCUMENTS

| | | | |
|---|---|---|---|
| 4,380,175 | * 4/1983 | Griffen | 177/211 |
| 4,453,609 | * 6/1984 | Griffen et al. | 177/211 |
| 4,657,097 | * 4/1987 | Griffen | 177/211 |
| 4,747,456 | * 5/1988 | Kitagawa et al. | 177/211 |
| 4,785,673 | * 11/1988 | Aumard | 73/862.65 |
| 4,898,255 | * 2/1990 | Gaines | 177/211 |
| 5,154,247 | * 10/1992 | Nishimura et al. | 177/211 |
| 5,220,971 | * 6/1993 | Farr | 177/229 |
| 5,222,398 | * 6/1993 | O'Brien | 73/862.632 |
| 5,306,873 | * 4/1994 | Suzuki et al. | 177/229 |
| 5,425,278 | * 6/1995 | Perkins | 73/862.632 |
| 5,604,336 | * 2/1997 | Johnson | 177/229 |
| 5,623,128 | * 4/1997 | Grimm et al. | 177/211 |
| 5,756,943 | * 5/1998 | Naito et al. | 177/211 |
| 6,147,312 | * 11/2000 | Lockery | 177/211 |

FOREIGN PATENT DOCUMENTS 56-130630  10/1981  (JP) .
60-260820  12/1985  (JP) .

* cited by examiner

*Primary Examiner*—Randy W. Gibson
(74) *Attorney, Agent, or Firm*—Mark Borgman; Mark Bourgeois

(57) ABSTRACT

A weighing device designed to accurately measure an object's weight that is easier and more cost effective to produce. In particular, the device consists of a strain gage load cell having a pair of substrates mounted in parallel. The first and second substrates each contain a pair of resistors which are embedded in the surface of the substrate pair, forming a Wheatstone Bridge configuration. The substrates may be formed of ceramic.

19 Claims, 5 Drawing Sheets

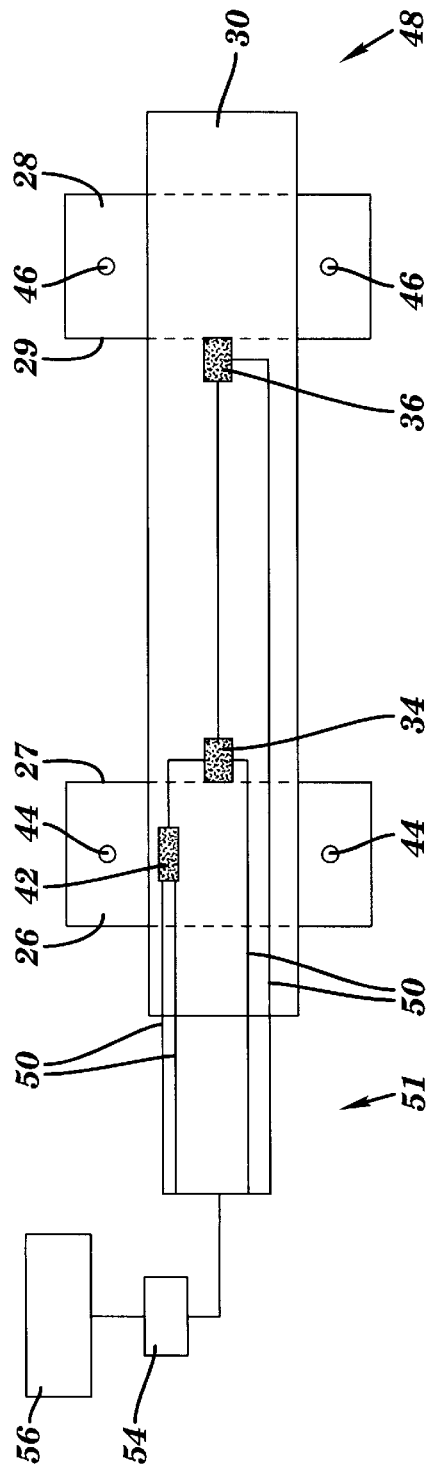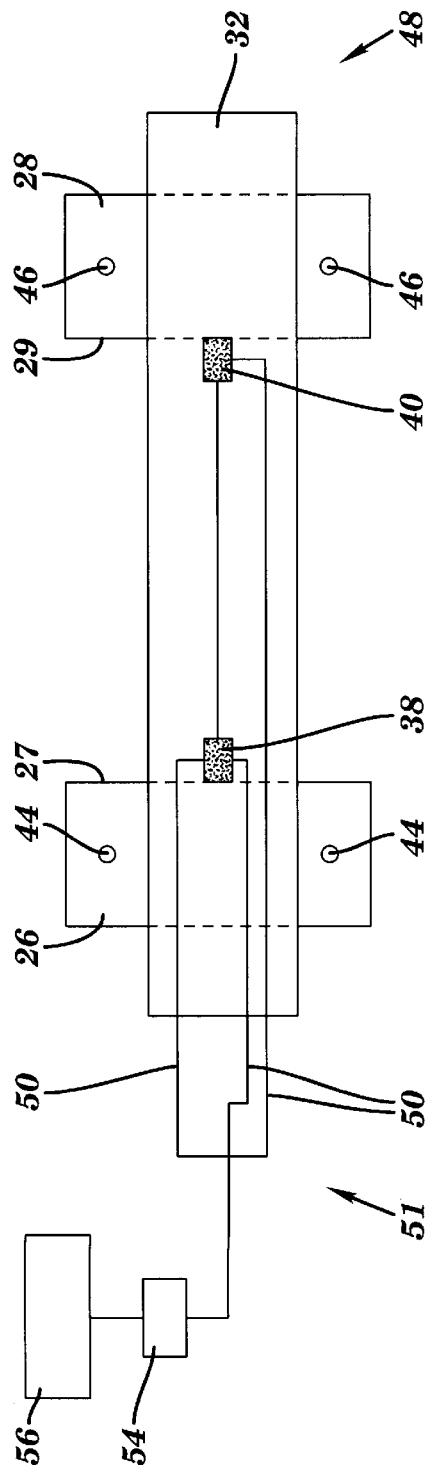

SHEAR BEAM LOAD CELL

BACKGROUND OF THE INVENTION

1. Technical Field

The present invention relates generally to a mechanoelectric converter, and more particularly, to a weighing device designed to convert mechanical loads into electric signals using a ceramic shear beam load cell.

2. Related Art

Heretofore, strain gage load cells used in scales for weighing applications consisted of a complex detection circuit made of resistors, which were mounted on the surface of a solid metal substrate. Referring to FIG. 1, a prior art strain gage load cell 10 is shown. In this device, a complex thin film or metal foil strain gage circuit 14 is mounted, typically by a glueing process, to a metal substrate 12, such as stainless steel or aluminum. Load cell 10 is mounted to a base (not shown) via through-holes 16.

FIG. 2 depicts another type of prior art strain gage load cell used in the industry. In this version, substrate 12 is hollowed out at midsection 18 in order to focus the stress in the area where the strain gage circuit 14 is mounted, thereby increasing the sensitivity accuracy of the device.

However, the machining associated with constructing strain gage load cells in either manner is quite costly. This may be partially attributed to the inherent cost of machining a substrate made of stainless steel.

Another costly disadvantage to the current methods used in the industry is the attachment process. Although gluing the strain gages to the surface of the substrate has recently become a reliable means of attachment, the expense remains high.

Based on the above, there exists a need to provide an accurate weighing device that is easier and less costly to produce.

SUMMARY OF THE INVENTION

The present invention provides a device that overcomes the above-identified problems of the related art through the use of, in general, a weighing device utilizing a strain gage load cell. The load cell is constructed of two substrates mounted in parallel, each having a pair of resistors embedded on opposing faces of the substrate pair. In the alternative, the resistors may be embedded on opposing faces of a single substrate. The substrates are preferably ceramic.

The first general aspect of the present invention provides for a weighing apparatus, comprising: a) a substrate pair including a first and a second substrate positioned substantially parallel to each other; b) a first and a second strain sensor mounted on opposing faces of the substrate pair; and c) a first and a second spacer, coupled to the first and second substrates at opposite ends thereof, for maintaining the first and second substrates in a spaced apart parallel position. This aspect allows for an accurate weighing apparatus that is cheaper and easier to construct than prior art weighing devices because of the two substrate configuration, having resistors mounted thereon. This aspect also allows for a weighing apparatus that does not deform or "creep" in response to cyclic loading.

The second general aspect of the present invention provides for a weighing apparatus, comprising: a) a first and a second substrate positioned substantially parallel to each other; b) a first and a second strain sensor mounted on opposite surfaces of the first substrate; and c) a first and a second spacer, coupled to the first and second substrates at opposite ends thereof, for maintaining the first and second substrates in a spaced apart parallel position. This allows for similar advantages as those mentioned in the first aspect.

The third general aspect of the present invention provides for a weighing apparatus comprising: a first spacer mounted to a base and a second spacer mounted to a weighing substrate; a first substrate fastened to the first and second spacers, the first substrate having a pair of resistors and a pair of trimming resistors mounted on a first side of the first substrate; a second substrate fastened to the first and second spacers and spaced from and in parallel with the first substrate, the second substrate having a pair of resistors mounted to a second side of the second substrate; and a set of traces connecting the first and second pair of resistors and the pair of trimming resistors to a microprocessing unit which is connected to an output unit. This aspect provides similar advantages as those associated with the first aspect. It also provides for a trimming device that is easier to manufacture, has better thermal tracking, eliminates the need for additional wiring, and allows for easier balancing via a laser trimming process.

The foregoing and other features and advantages of the present invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIG. 4 depicts a split view of the strain gage load cell in accordance with the present invention;

FIG. 5 depicts the electrical configuration of the trimming resistors in accordance with the present invention;

It should be noted that the drawings are not to scale. They merely depict schematic representations of the invention, and are not intended to portray specific parameters of the invention. The drawings are intended to show only typical embodiments of the invention, and therefore, should not be considered as limiting the scope of the invention.

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment.

Figure 3:
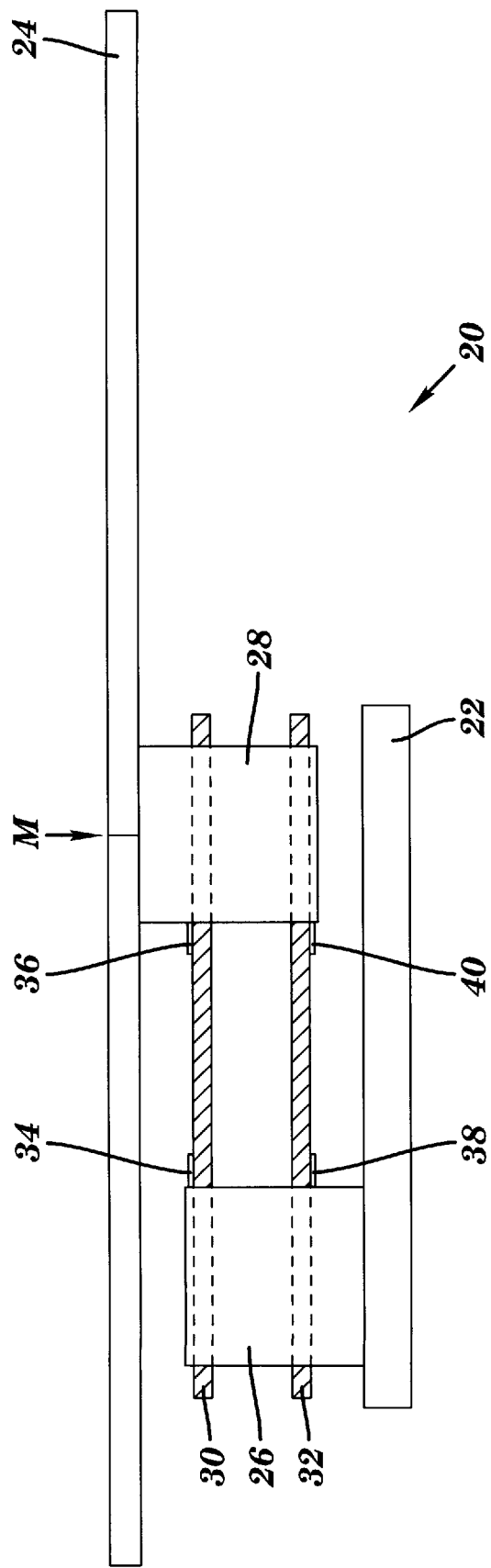
FIG. 3 depicts a cross-sectional view of a weighing device in accordance with the present invention.

FIG. 3 depicts a weighing device 20 in accordance with the present invention. Weighing device 20 includes a base 22, a spacer 26, a spacer 28, a weighing plate or substrate 24, a top substrate 30, a bottom substrate 32, and resistors 34, 36, 38 and 40. Top substrate 30 and bottom substrate 32 are fastened, substantially in parallel, to spacers 26 and 28, typically via an adhesive, such as an epoxy or pressure sensitive tape, etc. Top substrate 30 and bottom substrate 32 are made of ceramic, but may be any other similar elastic material possessing the desired properties, such as a polymer material, stainless steel, etc.

Spacer 26 is mounted to base 22 via bolts, screws, glue, welding, etc. Using similar methods, spacer 28 is mounted to weighing plate 24 at a midpoint M. Spacers 26 and 28 are typically made of aluminum, but may be any hard material, such as plastic, metal, ceramic, etc. Resistors 34 and 36 are embedded into the top side of top substrate 30, and resistors 38 and 40 are embedded into the bottom side of bottom substrate 32. Resistors 34, 36, 38 and 40 are electrically connected to form a Wheatstone Bridge configuration, commonly used in the industry. Resistors 34, 36, 38 and 40 are embedded into their respective substrates via a screen printing process, baked on using a firing kiln, or by other comparable method. These methods eliminate the expense and unreliability associated with the prior art gluing process.

FIGS. 4 and 5 depict a split view of strain gage load cell 48 in accordance with the present invention, wherein FIG. 4 shows the top side of top substrate 30 and FIG. 5 shows the bottom side of bottom substrate 32. Load cell 48 includes spacers 26 and 28, top substrate 30, bottom substrate 32, resistors 34, 36, 38 and 40, a trimming resistor 42, electrical connections or traces 50, microprocessing unit 54 and display unit 56. Top substrate 30 includes trimming resistors 42a and 42b (not found on bottom substrate 32), which is mounted on top substrate 30 over spacer 26. The electrical configuration of trimming resistor 42 in relation to resistors 34, 36, 38 and 40 is shown in FIGS. 4 and 5. Trimming resistor 42 is designed to electrically balance the Wheatstone Bridge. Unlike the unbalanced prior art devices, which typically add discrete trimming resistors at a location adjacent to the device, the present invention mounts the trimming resistor to top substrate 30. This allows for easier manufacturing, better thermal tracking, the elimination of additional wiring, and allows for easier balancing via a laser trim process.

Electrical connections or traces 50 are composed of a thick film material and are preferably screen printed onto top substrate 30 and bottom substrate 32. This process reduces the cost of electrical connections and eliminates any reliability problems associated with the prior art gluing process. Electrical connections or traces 50 are soldered to wires 51, which connect load cell 48 to a microprocessing unit 54, which is then electrically connected to a display unit 56, i.e., a computer screen, a printer, etc. Microprocessing unit 54 calibrates and converts the resistance measurement (volts) received from load cell 48 into the desired units of measure, i.e., pounds, ounces and so on, which is then displayed on display unit 56.

Figure 1:
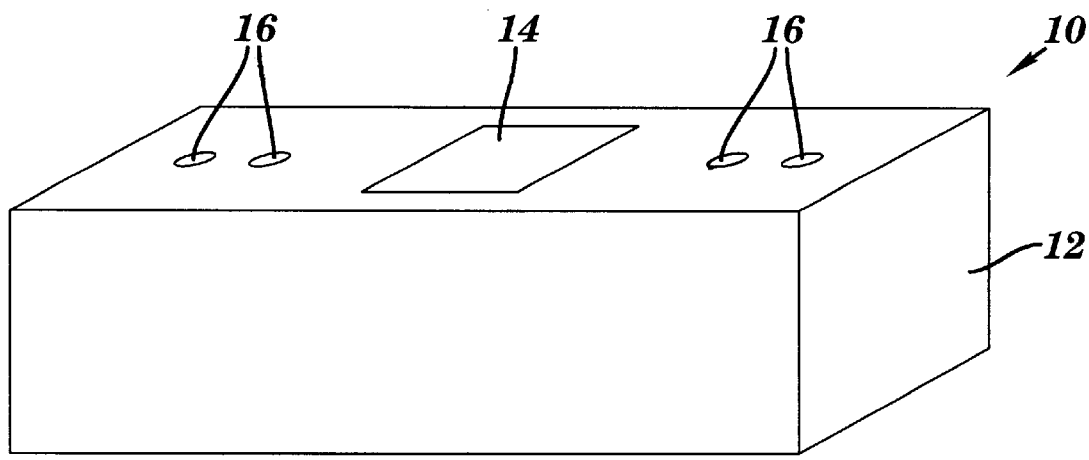
FIG. 1 depicts a prior art load cell constructed of a solid substrate.
Figure 2:
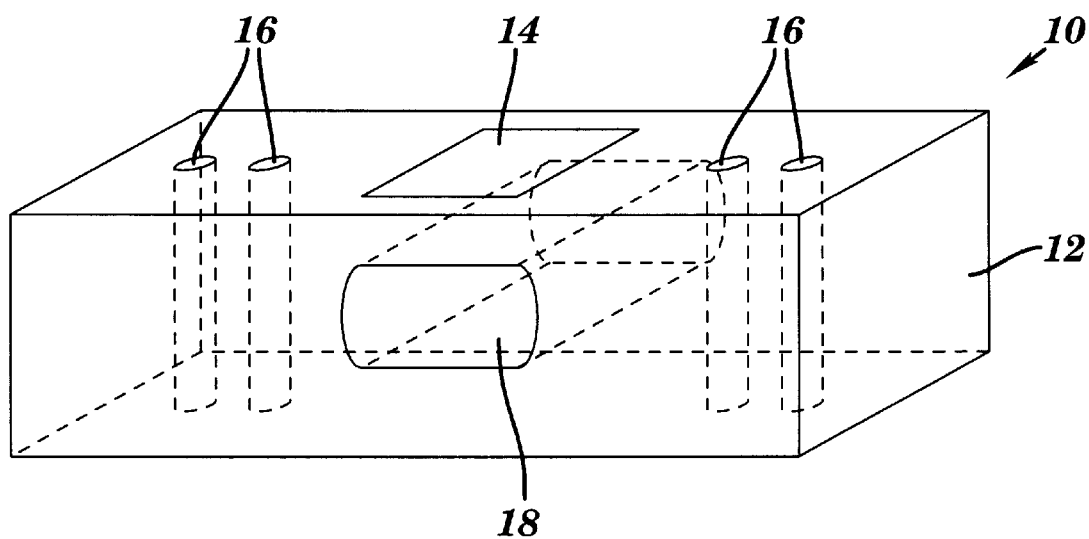
FIG. 2 depicts a prior art load cell wherein the substrate contains a hollowed mid-section.

Spacer 26 contains threaded through-holes 44 to fasten, via bolts, screws, etc., the left side of load cell 48 to base 22 (as shown in FIG. 3). Similarly, spacer 28 contains threaded through-holes 46 to fasten, via bolts, screws, etc., the right side of load cell 48 to weighing plate 24 (as shown in FIG. 3). It should be noted that the placement of the threaded through-holes 44 and 46 reduces the amount of torque on the holes and bolts used for connection, as compared to the in-line placement in the prior art (see FIGS. 1 and 2), which tends to shear the connecting bolts over time. Spacers 26 and 28 may also be connected to base 22 and weighing plate 24, respectively, via glue, welding, etc.

It should be noted that resistors 34 and 38 are to be mounted over the inside edge 27 of spacer 26, as depicted in FIG. 4, since this is a location of high stress. Consequently, this is a good place to detect a distortion in the elements upon the application of weight. Likewise, resistors 36 and 40 should be mounted over the inside edge 29 of spacer 28.

Figure 6:
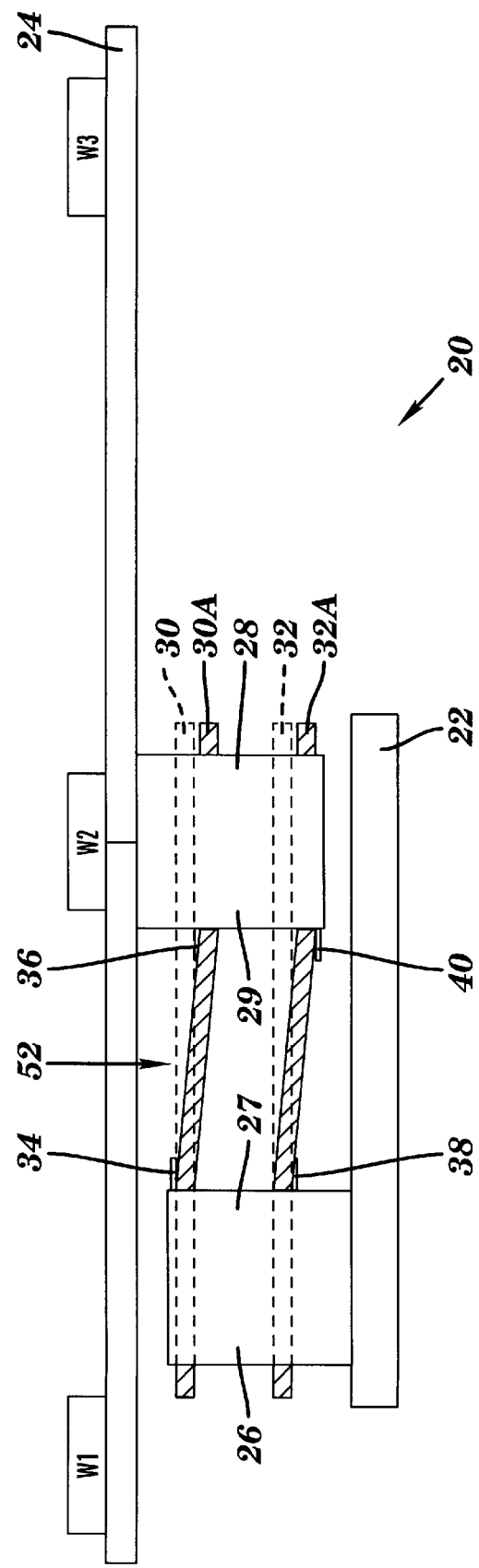
FIG. 6 depicts a cross-sectional view of a loaded weighing device in accordance with the present invention.

FIG. 6 shows an enlarged view of weighing device 20 to illustrate the displacement of substrates 30 and 32 by weight. When a weight W is applied to weighing plate 24, spacer 28 is forced downward toward base 22. Substrates 30 and 32 are distorted at their mid-sections 52, between spacers 26 and 28, while the portions of the substrates extending beyond the spacers remain in parallel. Resistors 34, 36, 38 and 40 undergo corresponding variations which in turn provides a measure of the amount of distortion in substrates 30 and 32 at inner surfaces 27 and 29.

Figure 7:
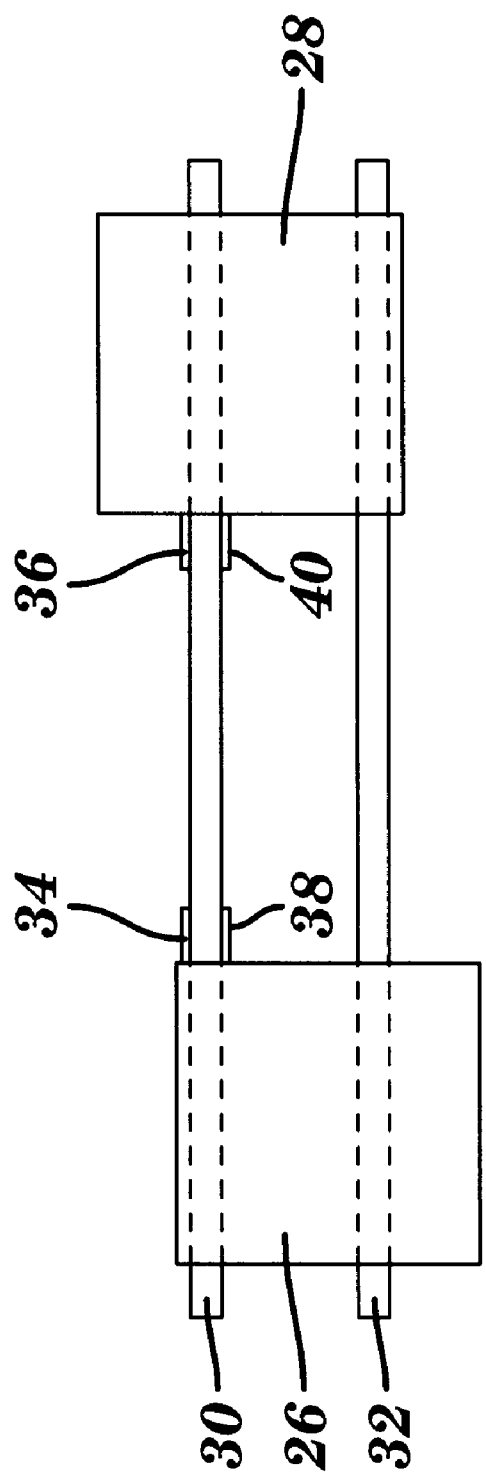
FIG. 7 depicts a variation of the present invention.

FIG. 7 depicts a variation of load cell 48 in accordance with the present invention, wherein resistors 34 and 36 are embedded into the top surface of top substrate 30 and resistors 38 and 40 are embedded into the bottom surface of top substrate 30. It should also be noted that although bottom substrate 32 is shown, it is not necessary when resistors 34, 36, 38, and 40 are embedded into top substrate 30.

The construction methods as described in this disclosure utilize at least four resistors to make up a full Wheatstone bridge circuit. It should be noted that less than four resistors may be used with the construction but would cause some sacrifice in performance. The number of resistors, and their locations are not limited by the present disclosure.

It should also be noted that the sensitivity of weighing device 20 can be altered by varying the horizontal distance between spacers 26 and 28, or by altering the dimensions of top and bottom substrates 30 and 32, respectively. For example, as the distance between the spacers increases, mid-section 52 of the device will be less rigid therefore more responsive to the application of a weight. Whereas decreasing the distance between spacers increases the rigidity of mid-section 52, therefore making the device less sensitive to the application of weight. Similarly, by increasing the thickness or width, or decreasing the length of substrates 30 and 32 they become less flexible and device 20 becomes more rigid, thus less sensitive to the application of weight.

It should be appreciated that the present invention may be used in a variety of weighing applications, such as weighing letters, weighing passengers sitting in a car seat, etc.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

We claim:

1. A weighing apparatus, comprising:
   a) a first and a second substrate positioned substantially parallel to each other;
   b) a first and a second strain sensor formed on opposing faces of the first and second substrate; and
   c) a first and a second spacer, coupled to the first and second substrates at opposite ends thereof, for maintaining the first and second substrates in a spaced apart parallel position; and
   d) a trimming resistor electrically interconnected with the strain sensors and located on the first substrate physically away from the area of deflection.

2. The weighing apparatus of claim 1, wherein the first strain sensor is a pair of resistors that are mounted at opposite ends of the first substrate in a region adjacent to opposing surfaces of the first and second spacers.

3. The weighing apparatus of claim 2, wherein the second strain sensor is of a pair of resistors that are mounted on opposite ends of the second substrate in a region adjacent to opposing surfaces of the first and second spacers.

4. The weighing apparatus of claim 1, wherein the first and second substrates have spacer regions that are attached to the first and second spacer, and a bridging region that bridges between the spacer regions.

5. The weighing apparatus of claim 4, wherein the first and second substrates have a first resting position that maintains the substrates in a substantially parallel orientation, and a second position that maintains the spacer regions in parallel orientation to each other but has the bridging region bending relatively downward.

6. The weighing apparatus of claim 5, wherein the first and second spacers are maintained relatively parallel to each other in the second position.

7. A weighing apparatus, comprising:
   a) a first and a second substrate positioned substantially parallel to each other, the substrates having a first and second end, the substrates further capable of deflection upon a stress being placed upon a first end relative to the second end;
   b) a first and a second strain sensor mounted on opposite surfaces of the first substrate;
   c) a first and a second spacer, coupled to the first and second substrates at opposite ends thereof, for maintaining the first and second substrates in a spaced apart parallel position; and
   d) a trimming resistor electrically interconnected with the strain sensors and located on the first substrate physically away from the area of deflection.

8. The weighing apparatus of claim 7, wherein the first strain sensor is a pair of resistors that are mounted at opposite ends of the first substrate in a region adjacent to opposing surfaces of the first and second spacers.

9. The weighing apparatus of claim 8, wherein the second strain sensor is a pair of resistors that are mounted on the opposite surfaces of the first substrate in a region opposite the first strain sensor resistor pairs and adjacent to opposing surfaces of the first and second spacers.

10. The weighing apparatus of claim 7, wherein the first and second substrates have spacer regions that are attached to the first and second spacers, and a bridging region that bridges between the spacer region.

11. The weighing apparatus of claim 10, wherein the first and second substrates have a first resting position that maintains the substrates in substantially parallel orientation, and a second position that maintains the spacer regions in parallel orientation to each other but has the bridging region bending relatively downward.

12. The weighing apparatus of claim 11, wherein the first and second spacers are maintained relatively parallel to each other in the second position.

13. The weighing apparatus of claim 12, wherein the first and second substrates are made of ceramic and the first and second spacers are made of aluminum.

14. A weighing apparatus comprising:
   a) a first spacer mounted to a base and a second spacer mounted to a weighing substrate, at a midpoint of the weighing substrate;
   b) a first substrate fastened to the first and second spacers, the first substrate having a pair of resistors mounted on a first side of the first substrate; and
   c) a trim resistor located on the first substrate over the spacer so as to be away from an area of deflection when the substrate is placed under stress; and
   c) a set of traces connecting the first and second pair of resistors and the trim resistor to a microprocessing unit which is connected to an output unit.

15. The weighing apparatus of claim 14, wherein the left and right spacers are aluminum.

16. The weighing apparatus of claim 14, wherein the first substrate is ceramic.

17. The weighing apparatus of claim 14, wherein the first and second pair of resistors are fastened to the first substrate by baking in a kiln.

18. The weighing apparatus of claim 14, wherein each of the first pair and second pair of resistors are mounted to the first substrate at a location of high shear stress on the first substrate.

19. The weighing apparatus of claim 14, wherein a second substrate is fastened to the first and second spacers and spaced from and in parallel with the first substrate, the second substrate having a pair of resistors mounted to a second side of the second substrate.

* * * * *